(12) United States Patent
Ito et al.

(10) Patent No.: US 7,432,636 B2
(45) Date of Patent: Oct. 7, 2008

(54) DRIVING DEVICE AND OPTICAL INSTRUMENT

(75) Inventors: Yoshihiro Ito, Saitama (JP); Yoji Naka, Saitama (JP); Takehiko Senba, Saitama (JP); Haruo Onozuka, Saitama (JP); Yukio Noguchi, Saitama (JP); Mitsuo Manabe, Saitama (JP)

(73) Assignees: Fujinon Corporation, Saitama (JP); FUJIFILM Corporation, Tokyo (JP)

( * ) Notice: Subject to any disclaimer, the term of this patent is extended or adjusted under 35 U.S.C. 154(b) by 429 days.

(21) Appl. No.: 11/230,673

(22) Filed: Sep. 21, 2005

(65) Prior Publication Data

US 2006/0061234 A1    Mar. 23, 2006

(30) Foreign Application Priority Data

Sep. 22, 2004    (JP)    ............................. 2004-274426
Feb. 24, 2005    (JP)    ............................. 2005-049530

(51) Int. Cl.
*H01L 41/04*    (2006.01)
*G02B 7/02*    (2006.01)

(52) U.S. Cl. ...................................... 310/328; 310/317
(58) Field of Classification Search ................. 310/328, 310/317, 316.01–316.03; 359/822–824
See application file for complete search history.

(56) References Cited

U.S. PATENT DOCUMENTS

| | | | |
|---|---|---|---|
| 3,349,259 A * | 10/1967 | Kistler | ........................ 310/338 |
| 3,390,287 A * | 6/1968 | Sonderegger | ................. 310/329 |
| 4,523,121 A * | 6/1985 | Takahashi et al. | ............. 310/334 |
| 4,667,127 A * | 5/1987 | Krempl et al. | ................ 310/338 |
| 5,134,334 A | 7/1992 | Onishi et al. | |
| 5,225,941 A | 7/1993 | Saito et al. | |
| 5,589,723 A | 12/1996 | Yoshida et al. | |
| 5,875,099 A * | 2/1999 | Maesaka et al. | .............. 361/760 |
| 6,114,798 A * | 9/2000 | Maruyama et al. | ...... 310/323.06 |
| 6,121,858 A * | 9/2000 | Yamamoto et al. | ........... 333/189 |
| 2003/0015944 A1* | 1/2003 | Schober et al. | .............. 310/366 |
| 2005/0275318 A1* | 12/2005 | Maruyama et al. | ........... 310/366 |

FOREIGN PATENT DOCUMENTS

EP    464764 A1 *   1/1992
JP    2001119962 A *   4/2001

* cited by examiner

*Primary Examiner*—Jaydi A San Martin
(74) *Attorney, Agent, or Firm*—Sughre Mion, PLLC

(57) ABSTRACT

A piezoelectric actuator having a frame portion includes a drive shaft for frictional engagement with an engageable barrel arm of a lens unit. First and second piezoelectric elements are supported on the frame portion, and provided with first and second ends of respectively the drive shaft. A drive pulse generator supplies the piezoelectric elements with a drive signal to expand or contract the piezoelectric elements, and moves the engageable barrel arm in an axial direction by an alternately repeating sequence of shifting the drive shaft at low and high speeds in the axial direction. In the shifting at the high speed, the piezoelectric elements shift the drive shaft in a backward direction quickly, to move the drive shaft in the backward direction relative to the engageable barrel arm being stationary with inertial force.

30 Claims, 16 Drawing Sheets

PERIOD P1

PERIOD P2

NOT POWERED

DRIVING DEVICE AND OPTICAL INSTRUMENT

BACKGROUND OF THE INVENTION

1. Field of the Invention

The present invention relates to a driving device and optical instrument. More particularly, the present invention relates to a driving device and optical instrument in which a piezoelectric element is used to apply force to a device to be driven.

2. Description Related to the Prior Art

An optical instrument such as a camera includes an actuator as a driving device, and a mechanical element for being driven by the actuator. For example, U.S. Pat. No. 5,225,941 (corresponding to JP-A 4-069070) and U.S. Pat. No. 5,589,723 (corresponding to JP-A 7-274543) disclose a use of a piezoelectric actuator in a camera as an electromechanical converting element or transducer.

In FIG. 21, a piezoelectric actuator of the prior art for use with a lens is illustrated. A lens barrel 100 as an element to be driven includes a projection 101 and holes 101a and 101b. The projection 101 projects from the periphery of the lens barrel 100. The holes 101a and 101b are formed to extend in the optical axis direction. A drive shaft 102 extends through the holes 101a and 101b, and is frictionally engaged in a slidable manner. Holes 104 and 105 are formed in a frame portion 103. The drive shaft 102 is inserted through the holes 104 and 105 and supported in a slidable manner in the axial direction. A piezoelectric element 106 in a piezoelectric actuator has a first end secured to the frame portion 103, and a second end secured to an end of the drive shaft 102.

The piezoelectric element 106 response to a drive pulse as an electric signal, and either expands or contracts in its direction of thickness, to shift the drive shaft 102 in the axial direction. The drive pulse sent to the piezoelectric element 106 has a waveform defined by a combination of a period of a slow rise of the voltage and a succeeding period of a quick drop of the voltage. The piezoelectric element 106 shifts by the expansion at a low speed in the direction C in the period of the slow rise, and shifts by the contraction at a high speed in the direction C in the period of the quick drop.

In the period of the slow rise of the voltage, the drive shaft 102 shifts in the direction C at a low speed. The lens barrel 100 shifts together with the drive shaft 102 in the direction C in keeping frictional coupling with the drive shaft 102 at the holes 110a and 101b. In the succeeding period of the quick drop of the voltage, the drive shaft 102 shifts at a high speed in reverse to the direction C. The holes 110a and 101b are released from the frictional coupling with the drive shaft 102. The lens barrel 100 is kept positioned by the inertia. As a result, a relative position of the lens barrel 100 relative to the drive shaft 102 is changed. The lens barrel 100 is moved in the direction C from the initial position.

The drive pulse of this form is sent to the piezoelectric element 106 consecutively, to move the lens barrel 100 in the direction C continuously. If movement of the lens barrel 100 is desired in the direction opposite to the direction C, a drive pulse is sent to the piezoelectric element 106, the pulse having a waveform defined by a combination of a period of a quick rise of the voltage and a succeeding period of a slow drop of the voltage.

There are problems in the above-indicated prior documents. A base end of the drive shaft 102 is secured to the piezoelectric element 106. A distal end of the drive shaft 102 is loosely connected with the frame portion 103 at the hole 104. Driving force of the piezoelectric element 106 is difficult to transmit in a reliable manner at the distal end of the drive shaft 102. An amount of movement of the lens barrel 100 per one pulse decreases gradually in a direction from the base end to the distal end of the drive shaft 102 in the combined use of the lens barrel 100 and the drive shaft 102. It is impossible to control the lens barrel 100 stably in the vicinity of the distal end of the drive shaft 102. The same shortcoming remains if a device other than 100 is connected for being driven.

SUMMARY OF THE INVENTION

In view of the foregoing problems, an object of the present invention is to provide a driving device and optical instrument in which a piezoelectric element is used to apply force to a device to be driven, and with which a stroke of the driven device can be large even in a simple structure.

In order to achieve the above and other objects and advantages of this invention, a driving device for moving a movable structure is provided, and includes a drive shaft, adapted to frictional engagement with an engageable portion of the movable structure, and having first and second ends. First and second piezoelectric elements are provided with respectively the first and second ends. A frame portion supports the first and second piezoelectric elements. A driving circuit expands or contracts the first and second piezoelectric elements, and moves the movable structure in an axial direction by an alternately repeating sequence of shifting the drive shaft at low and high speeds in the axial direction.

In the shifting at the low speed, the first and second piezoelectric elements shift the drive shaft in a first direction slowly, to shift the movable structure in the first direction by the frictional engagement. In the shifting at the high speed, the first and second piezoelectric elements shift the drive shaft in a second direction quickly, to move back the drive shaft in the second direction relative to the movable structure being stationary with inertial force.

The first and second piezoelectric elements are supplied with respectively first and second drive signals, and the first and second drive signals change so sequentially that one of first and second piezoelectric elements shifts by expansion while a remaining one thereof shifts by contraction.

The first drive signal is constituted by a period of a slow rise of a voltage and a period of a quick drop of the voltage. The second drive signal is constituted by a period of a slow drop of the voltage and a period of a quick rise of the voltage.

Absolute values of the first and second drive signals are equal to each other, and signs thereof are different from each other.

The driving circuit varies any one of a voltage swing, a period and a phase of the first and second drive signals, to control a moving speed of the engageable portion.

In one preferred embodiment, the first and second drive signals are equal to each other, and are constituted by a period of a slow rise of a voltage and a period of a quick drop of the voltage, or by a period of a slow drop of the voltage and a period of a quick rise of the voltage. Electrodes of the first and second piezoelectric elements are different in a direction of connection with the driving circuit between the first and second piezoelectric elements.

The first piezoelectric element includes a first electrode secured to the first end of the drive shaft, and a second electrode, secured on the frame portion, and electrically connected with polarity opposite to the first electrode. The second piezoelectric element includes a third electrode secured to the second end of the drive shaft, and a fourth electrode, secured on the frame portion, and electrically connected with polarity opposite to the third electrode.

In another preferred embodiment, the drive shaft comprises first and second drive shafts for extending in the axial direction, and for engagement with each other, the first drive shaft having the first end, and the second drive shaft having the second end. The engageable portion is frictionally engaged with both the first and second drive shafts.

The engageable portion comprises first and second engageable portions for engagement with respectively the first and second drive shafts. The one device further comprises first and second arm portions for projecting to extend in respectively the first and the directions from an arm supporting position on a device surface, the first and second arm portions having ends provided with respectively the first and second engageable portions.

In a preferred embodiment, the engageable portion comprises first and second engageable portions for engagement with respectively the first and second drive shafts. The movable structure further comprises a channel shaped arm provided with the first and second engageable portions.

Furthermore, an end recess is formed in a third end of the first drive shaft. An end projection is formed to project from a fourth end of the second drive shaft, and secured to the end recess.

In one preferred embodiment, furthermore, an elastic element is secured between a third end of the first drive shaft and a fourth end of the second drive shaft.

The first drive shaft is shaped with a gradual decrease in a diameter thereof in a direction away from the first piezoelectric element, and the second drive shaft is shaped with a gradual decrease in a diameter thereof in a direction away from the second piezoelectric element.

An optical instrument having a frame portion includes a drive shaft. An engageable portion is driven by the drive shaft in frictional engagement therewith. First and second piezoelectric elements are supported on the frame portion, and provided with respectively first and second ends of the drive shaft. At least one driving circuit for supplying the first and second piezoelectric elements with a drive signal to expand or contract the first and second piezoelectric elements, and for moving the engageable portion in an axial direction by an alternately repeating sequence of shifting the drive shaft at low and high speeds in the axial direction. Wherein in the shifting at the low speed, the first and second piezoelectric elements shift the drive shaft in a first direction slowly, to shift the engageable portion in the first direction by the frictional engagement. Wherein in the shifting at the high speed, the first and second piezoelectric elements shift the drive shaft in a second direction quickly, to move back the drive shaft in the second direction relative to the engageable portion being stationary with inertial force.

Furthermore, there is a lens. A lens barrel holds the lens, and constitutes the engageable portion.

The engageable portion comprises first and second engageable portions. Furthermore, first and second arm portions project to extend in respectively the first and the directions from an arm supporting position on a periphery of the barrel, the first and second arm portions having ends provided with respectively the first and second engageable portions.

Furthermore, a solid state pickup element photoelectrically converts object light into a pickup signal, the object light being focused by the lens.

In another preferred embodiment, furthermore, a light amount control unit controls a light amount of incident light. The engageable portion is a transmission portion for driving the light amount control unit in response to movement of the drive shaft.

A driving device having a frame portion includes first and second drive shafts for extending in an axial direction, and for engagement with each other, the first and second drive shafts being adapted to frictional engagement with an engageable portion of one device to be driven. First and second piezoelectric elements are supported on the frame portion, and provided with first and second ends of respectively the first and second drive shafts. An elastic element is secured between a third end of the first drive shaft and a fourth end of the second drive shaft. At least one driving circuit supplies the first and second piezoelectric elements with a drive signal to expand or contract the first and second piezoelectric elements, and for moving the engageable portion in the axial direction by an alternately repeating sequence of shifting the first and second drive shafts at low and high speeds in the axial direction. In the shifting at the low speed, the first and second piezoelectric elements shift the first and second drive shafts in a first direction slowly, to shift the engageable portion in the first direction by the frictional engagement. In the shifting at the high speed, the first and second piezoelectric elements shift the first and second drive shafts in a second direction quickly, to move back the first and second drive shafts in the second direction relative to the engageable portion being stationary with inertial force.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
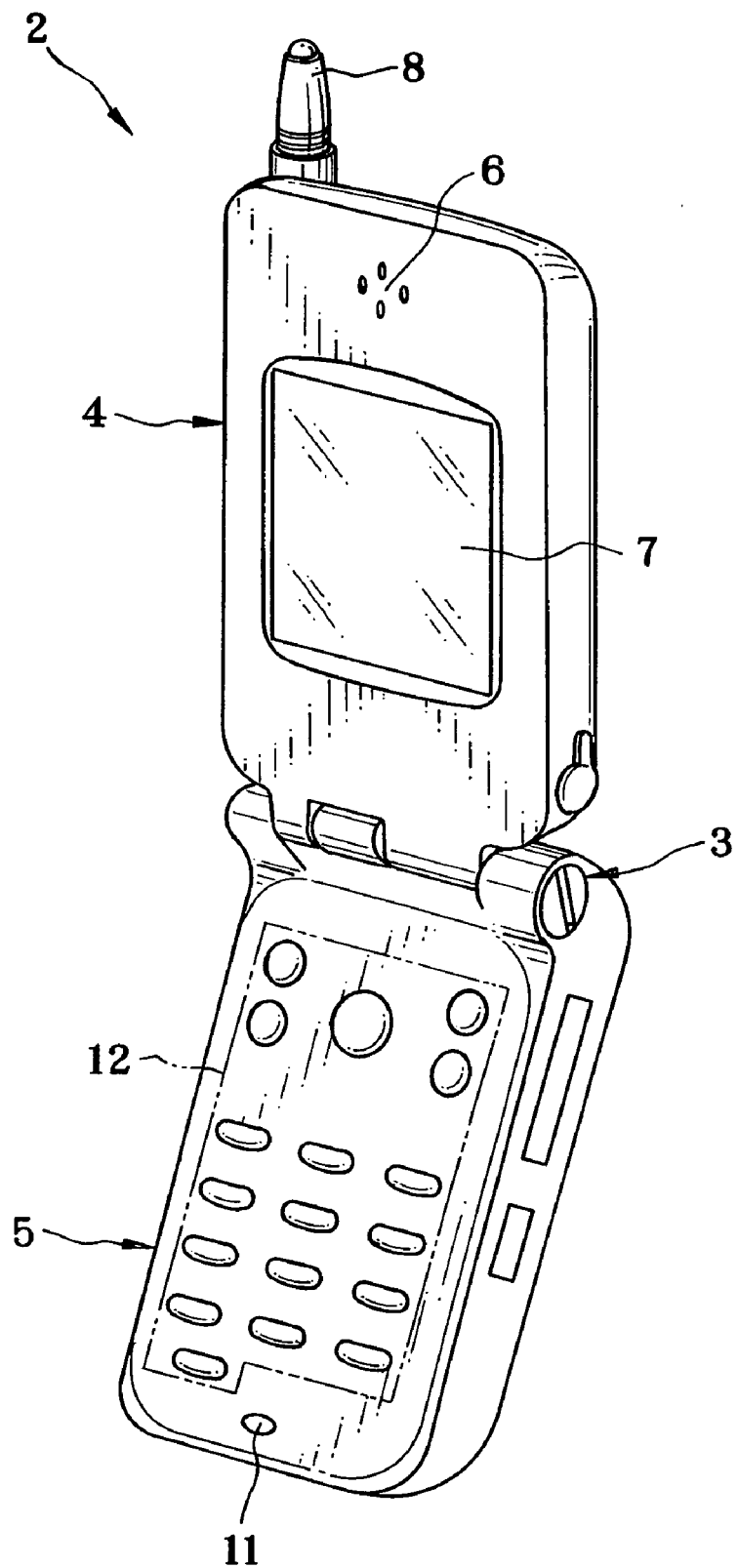
FIG. 1 is a perspective view illustrating a camera-built-in cellular telephone handset.
Figure 2:
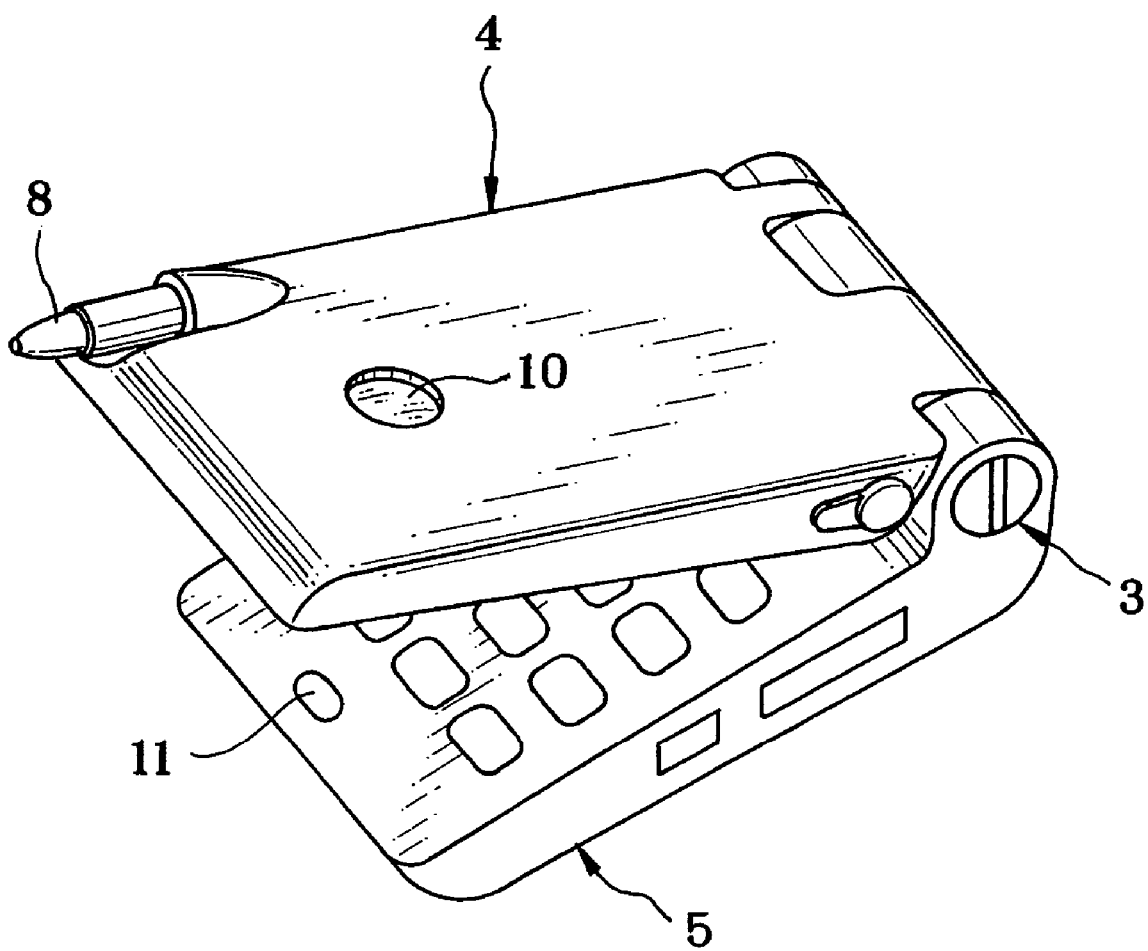
FIG. 2 is a perspective view illustrating a state of the cellular telephone handset folded halfway.

In FIGS. 1 and 2, a camera-built-in cellular telephone handset 2 as image pickup device is illustrated. The cellular telephone handset 2 includes a reception unit 4 and a transmission unit 5. A hinge 3 in the cellular telephone handset 2 interconnects the reception unit 4 and the transmission unit 5, and keeps the cellular telephone handset 2 foldable for portability.

A front of the reception unit 4 is provided with a speaker 6 and an LCD (liquid crystal display) panel 7. The speaker 6 outputs sounds, voices and the like. The LCD panel 7 displays visible information, such as menu patterns and a retrieved image photographed by a built-in camera. An antenna 8 is disposed on the rear of the reception unit 4, and transmits and receives radio waves for communication. An image pickup lens 10 appears in the front. A lens barrel 9 as a movable structure supports the image pickup lens 10 inside. See FIG. 4. A front of the transmission unit 5 is provided with a transmission microphone 11 and an input keypad 12. The transmission microphone 11 converts voices and the like to an audio signal. The input keypad 12 includes plural keys or buttons.

Figure 3:
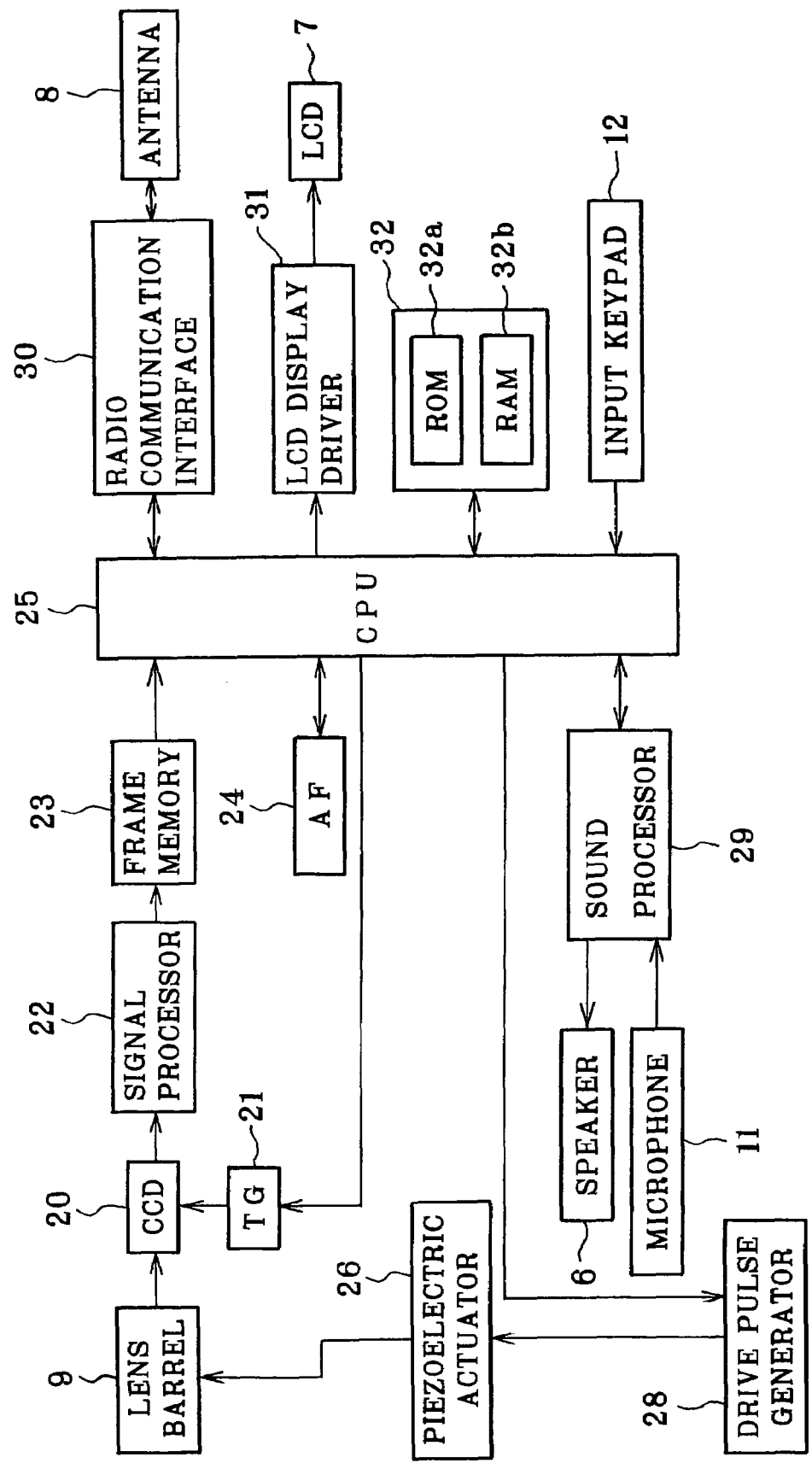
FIG. 3 is a block diagram schematically illustrating circuitry of the cellular telephone handset.

In FIG. 3, circuitry in the cellular telephone handset 2 is illustrated. A CCD image sensor 20 is a solid state pickup element for image pickup by electrical conversion of object light focused on the sensor plane by the image pickup lens 10 in the lens barrel 9. A timing generator (TG) 21 controls the CCD 20 for operation, for example determining a shutter speed of an electronic shutter. A signal processor 22 subjects the image pickup signal from the CCD 20 to sampling, amplification and A/D conversion, and outputs image data of a digital form. A frame memory 23 stores image data output by the signal processor 22 in a preliminary manner.

An autofocus (AF) circuit 24 receives image data read from the frame memory 23, extracts luminance information from a predetermined region according to the image data, to obtain an amount of a change of the luminance for respective adjacent pixels. As the amount of the change increases according to highness of contrast of the image, it is generally determined that an in-focus state is obtained when the sum of changes in the luminance is at its peak. A CPU 25 is supplied with an AF signal being the sum information of the changes by the AF circuit 24.

Figure 4:
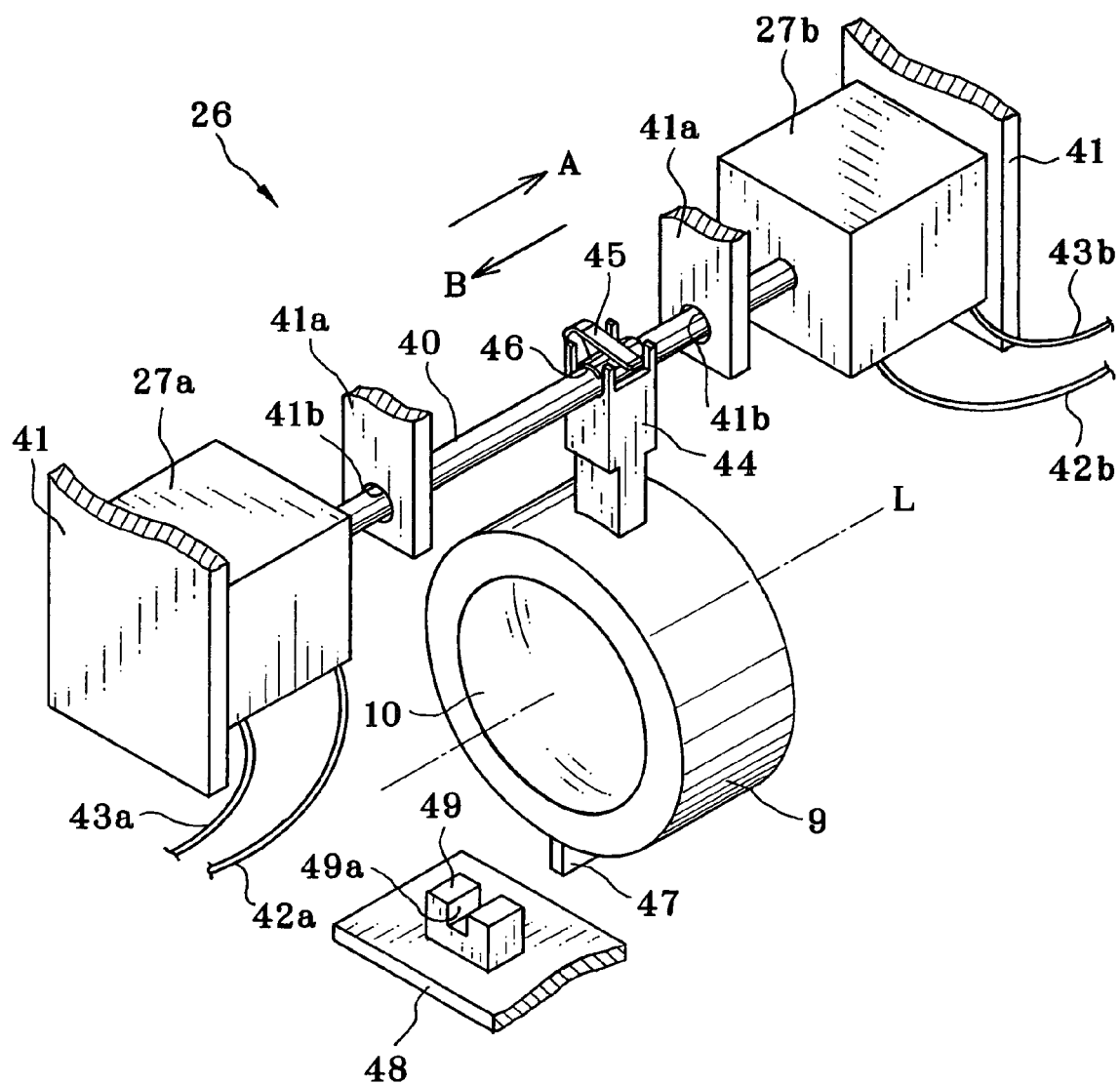
FIG. 4 is a perspective view partially broken, illustrating a piezoelectric actuator.

A piezoelectric actuator 26 is a driving device, and constituted by a first piezoelectric element 27a and a second piezoelectric element 27b of FIG. 4. The piezoelectric elements 27a and 27b are shiftable in a direction of their thickness in response to application of voltage, and either expands or contracts, and causes the lens barrel 9 to move in the direction along the optical axis L linearly. A drive pulse generator 28 as driving circuit is controlled by the CPU 25, and generates drive pulses to apply voltage to the piezoelectric elements 27a and 27b.

The CPU 25 monitors the AF signal input by the AF circuit 24 time-sequentially, and controls the drive pulse generator 28 according to the monitoring so as to move the lens barrel 9. The lens barrel 9 is stopped and positioned when the AF signal comes to its peak, to focus the object sharply. This is the pickup assembly in the cellular telephone handset 2.

A sound processor 29 processes the sound input by the transmission microphone 11 or sound to be output by the speaker 6 for processing, for example elimination of noise. A radio communication interface (I/F) 30 transmits and receives radio wave in the communication by use of the antenna 8. A LCD display driver 31 is controlled by a controller and drives the LCD panel 7 for display.

A data storage or memory 32 is constituted by a ROM 32a and a RAM 32b. The ROM 32a is non-volatile, and stores a control program for the CPU 25 to control relevant elements, and image data obtained by image pickup of the camera. The RAM 32b is volatile, and stores data generated in the course of image pickup in a preliminary manner.

The CPU 25 controls the entirety of the cellular telephone handset 2 on the basis of input signals input by the input keypad 12, and changes the cellular telephone handset 2 between the communication mode and camera mode.

In FIG. 4, the piezoelectric actuator 26 includes the piezoelectric elements 27a and 27b, a drive shaft 40 and a frame portion 41 for supporting various elements. Outer ends of the piezoelectric elements 27a and 27b are fixedly secured to the frame portion 41. A first end of the drive shaft 40 is secured to a remaining end of the first piezoelectric element 27a. A second end of the drive shaft 40 is secured to a remaining end of the second piezoelectric element 27b. A shaft support 41a protrudes from the frame portion 41. Through holes 41b are formed in the shaft support 41a, and receives insertion in a slidable manner.

The drive shaft 40 is formed from material which is lightweight and has high rigidity, such as carbon, beryllium and the like. Note that the drive shaft 40 may have an inner cylindrical chamber without a solid shape for the purpose of a lightweight structure and also with high rigidity.

Figure 5:
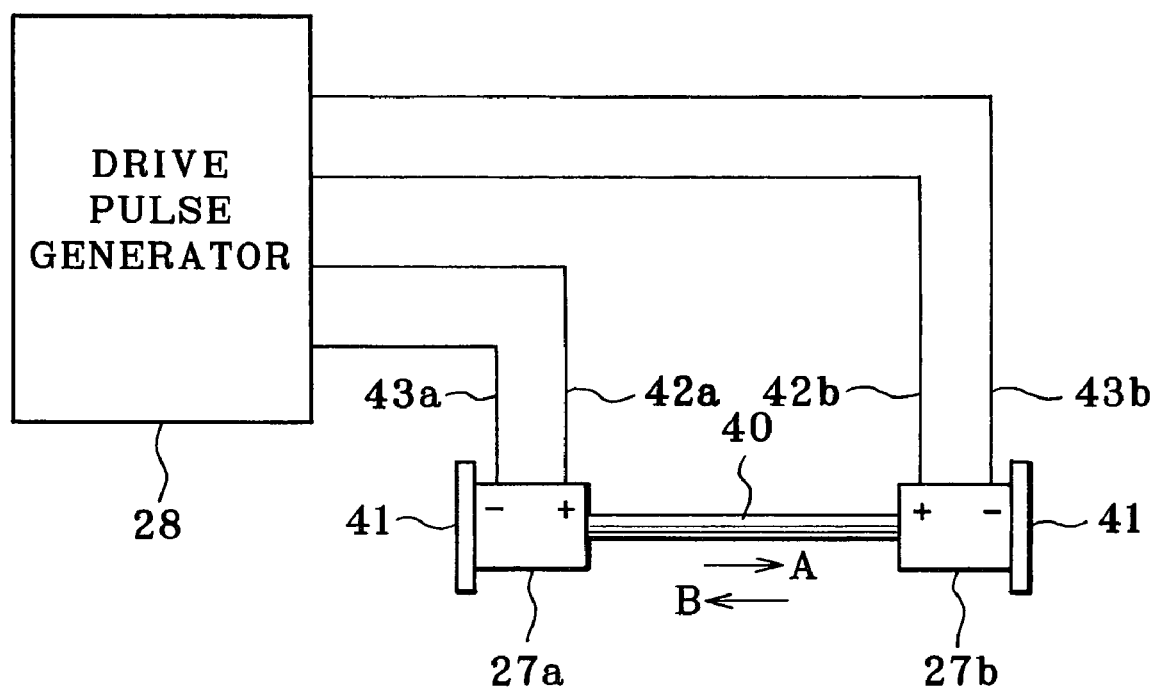
FIG. 5 is an explanatory view illustrating connection of the piezoelectric actuator and the drive pulse generator.

Each of the piezoelectric elements 27a and 27b is formed from piezoelectric ceramic material, and includes two opposite electrodes. Leads 42a and 43a on the positive and negative sides are connected with electrodes of the first piezoelectric element 27a. Leads 42b and 43b on the positive and negative sides are connected with electrodes of the second piezoelectric element 27b. In FIG. 5, the piezoelectric elements 27a and 27b are connected to the drive pulse generator 28 by the leads 42a, 43a, 42b and 43b.

The first piezoelectric element 27a, when positive voltage is applied to the lead 42a with reference to the lead 43a, expands in the thickness direction in comparison with the unloaded state without application of voltage at the leads 42a and 43a. When negative voltage is applied to the lead 42a with reference to the lead 43a, the first piezoelectric element 27a contracts in the thickness direction in comparison with the unloaded state. The second piezoelectric element 27b, when positive voltage is applied to the lead 42b with reference to the lead 43b, expands in the thickness direction. When negative voltage is applied to the lead 42b with reference to the lead 43b, the second piezoelectric element 27b contracts in the thickness direction.

Figure 6A:
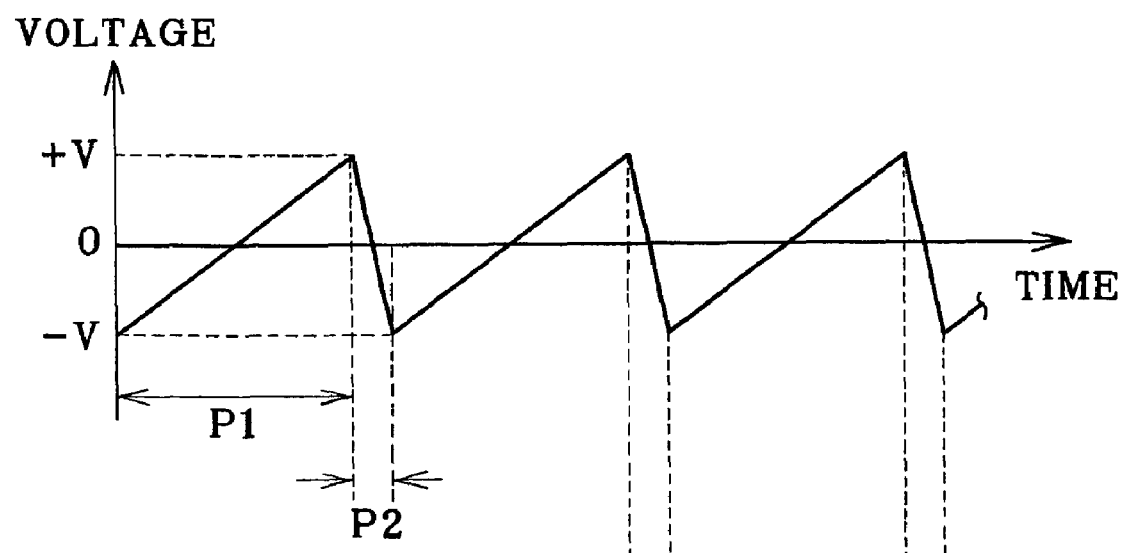
FIG. 6A is a graph illustrating a waveform of a drive pulse.
Figure 6B:
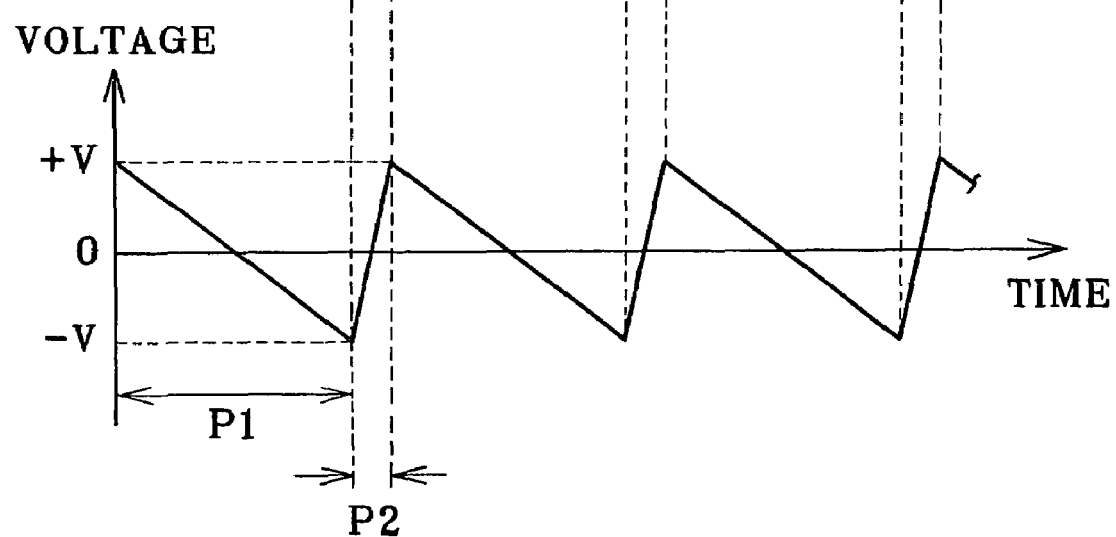
FIG. 6B is a graph illustrating a waveform of a drive pulse for one of the piezoelectric elements.

To slide the drive shaft 40 in the direction A, the first piezoelectric element 27a must be displaced for expansion, and simultaneously the second piezoelectric element 27b must be displaced for contraction at the same amount of the expansion, in view of preventing incidental deformation of the drive shaft 40. Also, to slide the drive shaft 40 in the direction B, the first piezoelectric element 27a must be displaced for contraction, and simultaneously the second piezoelectric element 27b must be displaced for expansion at the same amount of the contraction, in view of preventing incidental deformation of the drive shaft 40. Consequently, a first drive signal or pulse with the waveform of FIG. 6A is supplied to the first piezoelectric element 27a with the leads 42a and 43a while a second drive signal or pulse with the waveform of FIG. 6B is supplied to the second piezoelectric element 27b with the lead 42b and 43b. The second drive signal is a signal of the voltage of which an absolute value is equal to that of the first drive signal, but a sign is opposite to the same.

In FIG. 4, an engageable barrel arm 44 protrudes from the lens barrel 9, and engaged with the drive shaft 40 in a slidable manner. A biasing spring plate 45 is connected with the engageable barrel arm 44. A frictional pad 46 is disposed between the spring plate 45 and the drive shaft 40. The spring plate 45 biases the frictional pad 46 to press the drive shaft 40 on the frictional pad 46. The engageable barrel arm 44 keeps the lens barrel 9 slidable on the drive shaft 40. Also, the lens barrel 9 contacts the drive shaft 40 with friction predetermined suitably.

An indexing plate 47 is disposed with a lower end of the lens barrel 9. A photo interrupter 49 is disposed in the original position or home position of the lens barrel 9. A notch 49a is formed so that the indexing plate 47 is passable therein. A stationary base board 48 is disposed, and includes a light-emitting diode (LED, not shown) and photo transistor (not shown) so as to locate the notch 49a between those. The indexing plate 47 moves when the lens barrel 9 moves. When the indexing plate 47 becomes positioned at the notch 49a of the photo interrupter 49, light incident upon the photo transistor from the LED is blocked. The photo interrupter 49 detects a light blocked state to recognize the original position of the lens barrel 9. Upon turning on of powering of the cellular telephone handset 2, the lens barrel 9 is forcibly returned to the original position.

Figure 7:
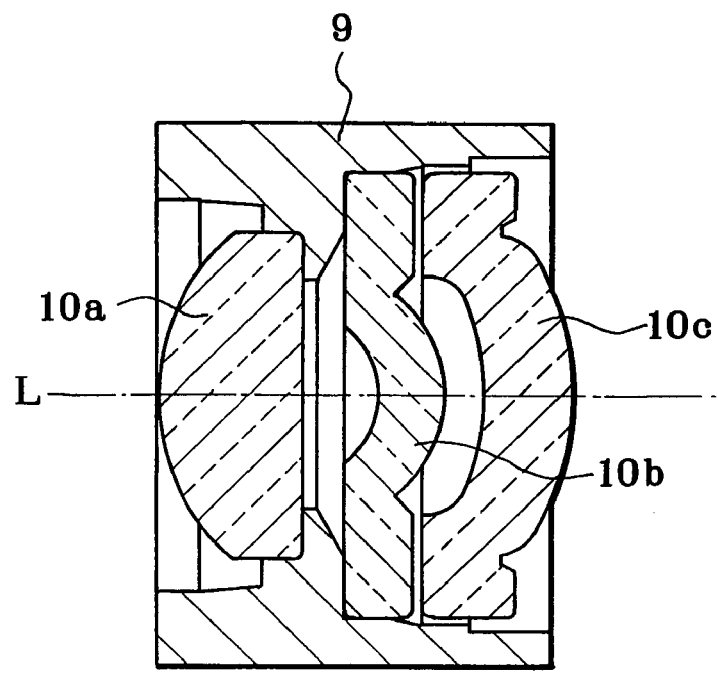
FIG. 7 is a vertical section illustrating a lens unit of a lens barrel.

The lens barrel 9 supports the image pickup lens 10. In FIG. 7, the image pickup lens 10 is a three-element lens including a first lens element 10a, a second lens element 10b and a third lens element 10c, arranged from the object side to the image side. The first lens element 10a is a meniscus lens having a positive power, having a convex surface on the object side, and a plane surface directed on the image side. The second lens element 10b is a meniscus lens having a negative power, having a concave surface on the object side, and an aspherical surface directed on the image side. The third lens element 10c is an aspherical lens having a negative power, having aspherical surfaces both on the object side and on the image side. The surface of the third lens element 10c on the image side is concave in a portion near to the optical axis L.

The lens barrel 9 with the image pickup lens 10 and the piezoelectric actuator 26 are combined as a lens unit, which is incorporated in the reception unit 4 and positioned for focusing object light on a sensitive plane of the CCD 20, the object light having passed the image pickup lens 10 on the optical axis L.

The frame portion 41 to which the piezoelectric actuator 26 is secured should be free from deformation. The frame portion 41 can have high rigidity, or may be additionally supported on a base plate having a great weight. However, other structures can be used in the frame portion 41. Partial regions of the frame portion 41 with the piezoelectric elements 27a and 27b may be formed with flexibility.

Figure 8:
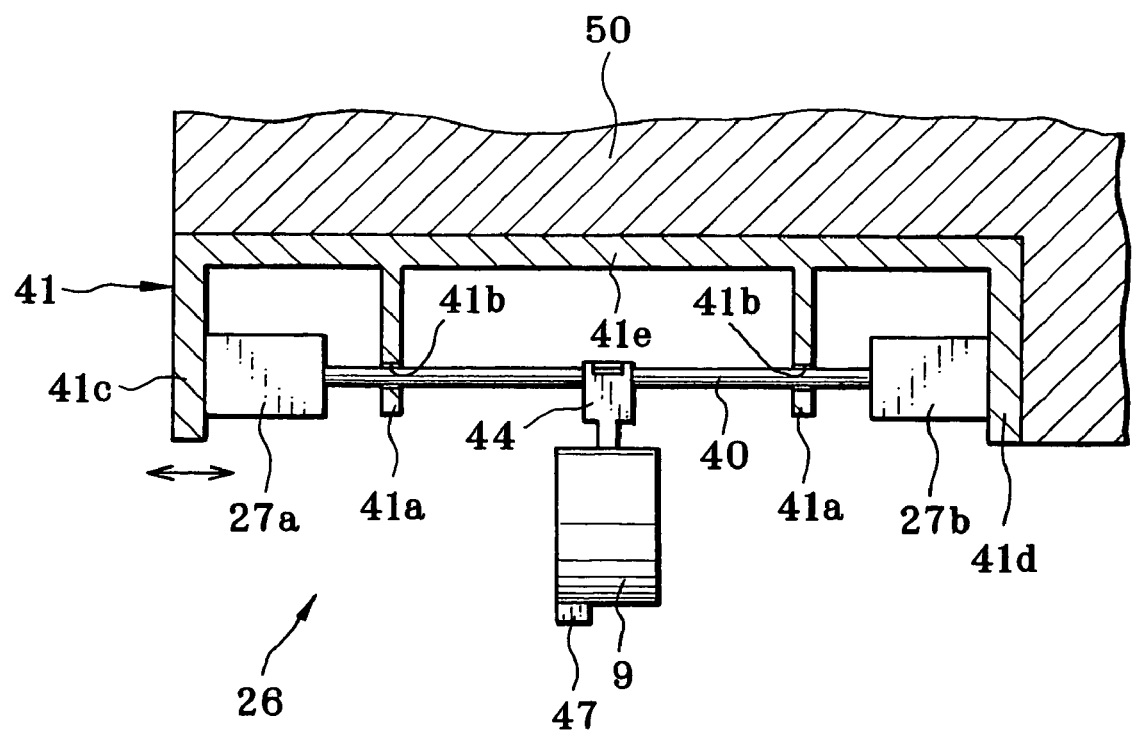
FIG. 8 is a vertical section partially broken, illustrating the piezoelectric actuator.

It is possible as depicted in FIG. 8 to use a body or casing 50 having a great weight. A first end panel 41c of the frame portion 41, where the first piezoelectric element 27a is stationary, extends in a flap-form from the casing 50 without attachment in a large area. A second end panel 41d of the frame portion 41, where the second piezoelectric element 27b is stationary, is firmly secured to the casing 50 in a large area. Also, an upper panel 41e is secured to the casing 50. This is effective in imparting flexibility to the first end panel 41c. It is likely that the piezoelectric elements 27a and 27b shift indicentally without synchronism. However, a difference in shifting between those can be absorbed because the first end panel 41c can flex. Note that the second end panel 41d can extend in a flap-form from the casing 50 in combination with the first end panel 41c which may be secured to the casing 50. Furthermore, it is possible that both of the two end panels 41c and 41d extend in a flap-form from the casing 50 without attachment in a large area. At least one of the two end panels 41c and 41d can have a smaller rigidity.

The camera mode, which is described now, is set by operating the input keypad 12 in the cellular telephone handset 2. Image data, obtained by the CCD 20 and stored in the frame memory 23 by the signal processor 22, is sent to the LCD display driver 31 to cause the LCD panel 7 to display a live image. The autofocus (AF) operation is effected by the AF circuit 24, the CPU 25 and the piezoelectric actuator 26. The shutter device is released by depression of the input keypad 12 while an object is focused sharply. Image data of one frame is written to the ROM 32a or an external memory such as a memory card (not shown).

The operation of the piezoelectric actuator 26 in the auto focusing is described now. To move the lens barrel 9 as a movable structure in the direction A of FIG. 4, the drive pulse generator 28 sends the drive pulse to the first piezoelectric element 27a with the leads 42a and 43a in the form depicted in FIG. 6A, and sends the drive pulse to the second piezoelectric element 27b with the leads 42b and 43b in the form depicted in FIG. 6B. In the period P1, the first piezoelectric element 27a displaces from the contraction to the expansion. In the period P2, the first piezoelectric element 27a displaces from the expansion to the contraction. In the period P1, the second piezoelectric element 27b displaces from the expansion to the contraction. In the period P2, the second piezoelectric element 27b displaces from the contraction to the expansion.

In the period P1, changes in the voltage between the drive pulses are at the low speed. The piezoelectric elements 27a and 27b shift slowly, to move the drive shaft 40 in the direction A of the arrow. The lens barrel 9 moves in the direction A of the arrow together with the drive shaft 40 in a state fictionally engaged with the drive shaft 40 at the engageable barrel arm 44. In the period P2, changes in the voltage between the drive pulses are at the high speed. The piezoelectric elements 27a and 27b shift quickly, to move the drive shaft 40 in the direction B of the arrow. The lens barrel 9 is movable relative to the drive shaft 40 because dissociated from the drive shaft 40 at the engageable barrel arm 44 in relation to the frictional engagement. The lens barrel 9 remains positioned owing to the inertial force in the state immediately after the period P1.

As a result, a relative position of the lens barrel 9 to the drive shaft 40 changes, to move the lens barrel 9 from the initial position in the direction A of the arrow. The drive pulse is applied to the piezoelectric elements 27a and 27b successively, to move the lens barrel 9 consecutively in the direction A.

Figure 9A:
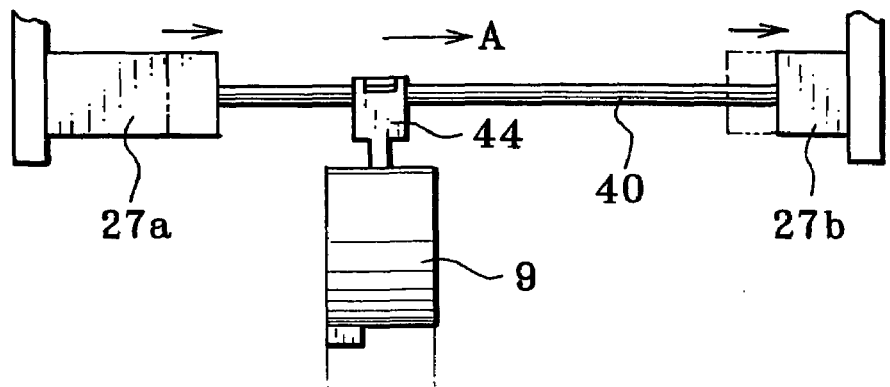
FIG. 9A is a side elevation illustrating a state of driving the lens unit by the piezoelectric actuator at a low speed.
Figure 9B:
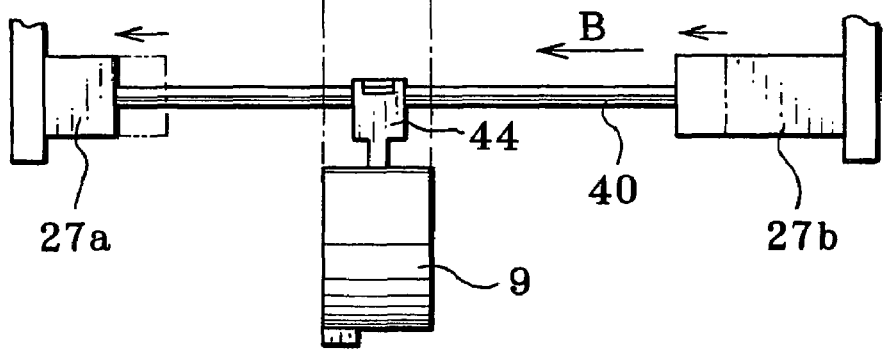
FIG. 9B is a side elevation illustrating a state of driving the lens unit by the piezoelectric actuator at a high speed.
Figure 9C:
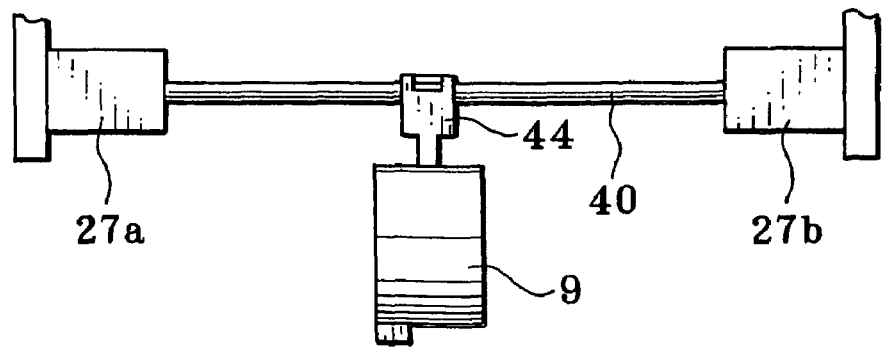
FIG. 9C is a side elevation illustrating a state of the lens unit without powering of the piezoelectric actuator.

In FIGS. 9A, 9B and 9C, movement of the lens barrel 9 in the direction A is illustrated. In the period P1 in FIG. 9A, the first piezoelectric element 27a expands at the low speed. The second piezoelectric element 27b contracts at the low speed. The lens barrel 9 is moved in the direction A. In the period P2 in FIG. 9B, the first piezoelectric element 27a contracts at the high speed. The second piezoelectric element 27b expands at the high speed. The lens barrel 9 is substantially stationary owing to the inertia. In FIG. 9C, the unpowered state of the piezoelectric elements 27a and 27b is depicted.

If movement of the lens barrel 9 in the direction B opposite to the arrow A is desired, voltage is applied across the leads 42a and 43a with the drive pulse of the waveform in FIG. 6B. Voltage is applied across the leads 42b and 43b with the drive pulse of the waveform in FIG. 6A. Operation of the elements relevant to the piezoelectric actuator 26 is the same as that according to the above.

Ends of the drive shaft 40 are driven by the piezoelectric elements 27a and 27b. This can prevent occurrence of a problem of the prior art in that stroke or an amount of movement per one drive pulse may vary in the course of movement in the lens moving range. An amount of movement of the lens barrel 9 per one drive pulse can be regular and can be greater than the prior art. Also, the drive shaft 40 can have a greater length than the prior art. The lens barrel 9 can be moved in a larger range because of the greater length of the drive shaft 40.

Figure 10:
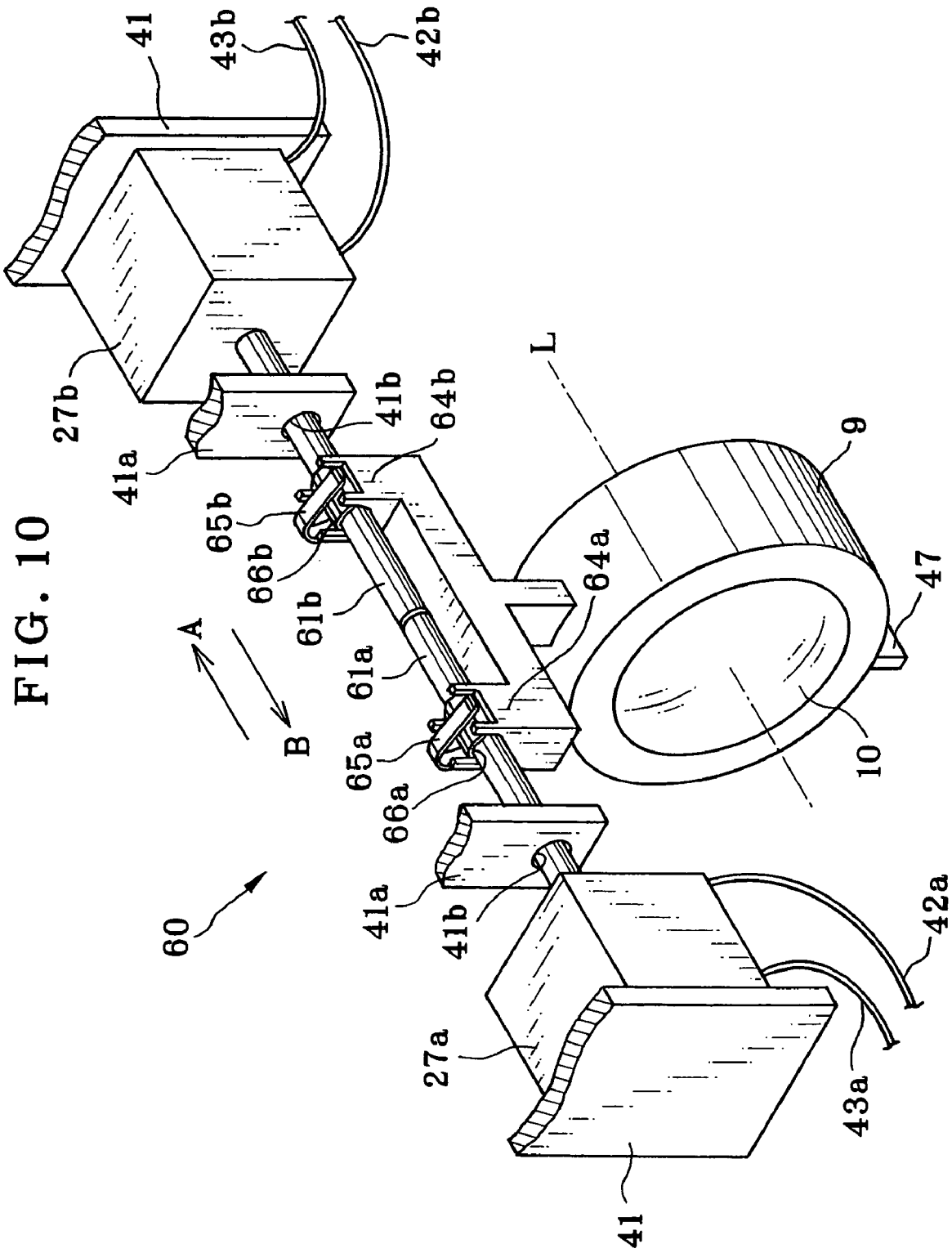
FIG. 10 is a perspective view partially broken, illustrating one preferred piezoelectric actuator.

Although the drive shaft 40 is single in the piezoelectric actuator 26 above, a combination of two coaxial drive shafts can be used. In FIG. 10, another preferred piezoelectric actuator 60 is illustrated. Elements in FIG. 10 similar to those in the embodiment of FIG. 4 are designated with identical reference numerals.

Figure 11:
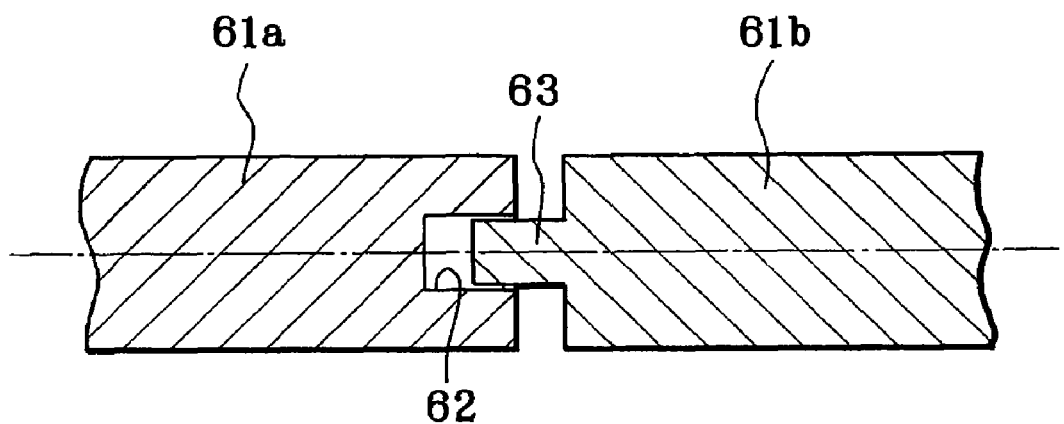
FIG. 11 is a vertical section illustrating ends of two drive shafts.

Each of a first drive shaft 61a and a second drive shaft 61b is formed from material which is lightweight and has high rigidity, such as carbon, beryllium and the like. Base ends of the two drive shafts 61a and 61b are secured to respectively ends of the piezoelectric elements 27a and 27b. In FIG. 11, distal ends of the two drive shafts 61a and 61b are coupled with one another. An end recess 62 is formed in the end of the first drive shaft 61a. An end projection 63 projects from the second drive shaft 61b. The end projection 63 is engaged in the end recess 62 movably. The two drive shafts 61a and 61b are coaxially coupled together in inserting the end projection 63 in the end recess 62.

In FIG. 10, the lens barrel 9 is provided with a first engageable barrel arm portion 64a and a second engageable barrel arm portion 64b. The first barrel arm portion 64a is engageable with the first drive shaft 61a. The second barrel arm portion 64b is engageable with the second drive shaft 61b. An arm supporting portion protrudes from the lens barrel 9 for supporting the two barrel arm portions 64a and 64b in a channel shape. A biasing spring plate 65a is secured to the first barrel arm portion 64a. A frictional pad 66a is secured between the spring plate 65a and the first drive shaft 61a. Also, a biasing spring plate 65b is secured to the second barrel arm portion 64b. A frictional pad 66b is secured between the spring plate 65b and the second drive shaft 61b. The lens barrel 9 is kept slidable on the first drive shaft 61a with the first barrel arm portion 64a, and slidable on the second drive shaft 61b with the second barrel arm portion 64b. The lens barrel 9 contacts the two drive shafts 61a and 61b with friction predetermined suitably.

The operation of the piezoelectric actuator 60 is the same as the above embodiment. The first drive pulse with the waveform of FIG. 6A is supplied to the first piezoelectric element 27a on the leads 42a and 43a while the second drive pulse with the waveform of FIG. 6B is supplied to the second piezoelectric element 27b on the leads 42b and 43b. This causes the lens barrel 9 to move in the direction A. In reverse to this, the first drive pulse with the waveform of FIG. 6B is supplied to the first piezoelectric element 27a on the leads 42a and 43a while the second drive pulse with the waveform of FIG. 6A is supplied to the second piezoelectric element 27b on the leads 42b and 43b. This causes the lens barrel 9 to move in the direction B.

While the lens barrel 9 moves in the direction A, force applied by the first piezoelectric element 27a to the first barrel arm portion 64a decreases according to the movement of the first barrel arm portion 64a toward the distal end of the first drive shaft 61a. At the same time, force applied by the second piezoelectric element 27b to the second barrel arm portion 64b increases, because of the movement of the second barrel arm portion 64b toward a base portion of the second drive shaft 61b. In contrast, while the lens barrel 9 moves in the direction B, force applied by the second piezoelectric element 27b to the second barrel arm portion 64b decreases according to the movement of the second barrel arm portion 64b toward the distal end of the second drive shaft 61b. At the same time, force applied by the first piezoelectric element 27a to the first barrel arm portion 64a increases, because of the movement of the first barrel arm portion 64a toward a base portion of the first drive shaft 61a.

The lens barrel 9 is supported by both of the two drive shafts 61a and 61b. If force applied to the lens barrel 9 by either one of the piezoelectric elements 27a and 27b is decreased in the course of movement, force of the remaining one those increases. This can prevent occurrence of a problem of the prior art in that stroke or an amount of movement per one drive pulse may vary in the course of movement in the lens moving range. An amount of movement of the lens barrel 9 per one drive pulse can be regular and can be greater than the prior art.

Figure 12:
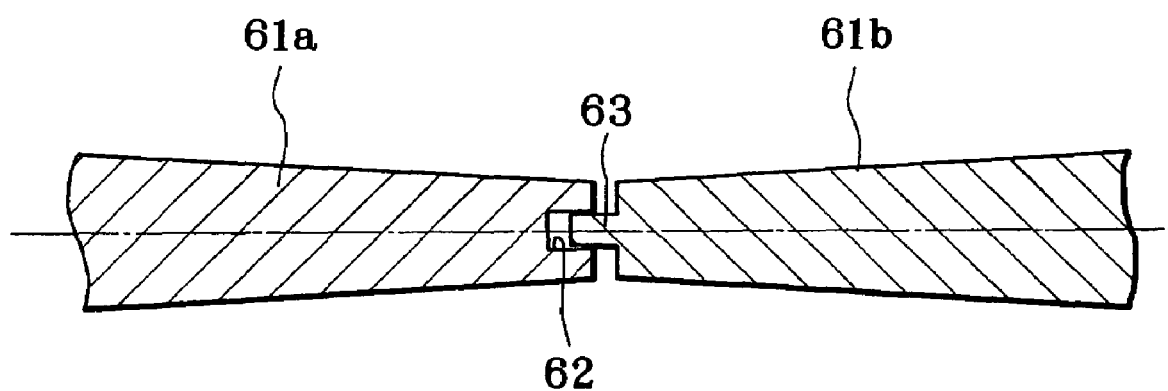
FIG. 12 is a vertical section illustrating ends of two drive shafts with a decreasing diameter.

In FIG. 12, a variant form of the combination of the two drive shafts 61a and 61b is illustrated. The two drive shafts 61a and 61b are rods having such a tilted surface as to decrease the diameter toward their distal end. Because of the reduced diameter, the ends of the two drive shafts 61a and 61b can be readily driven by the piezoelectric elements 27a and 27b with driving force. It is possible to predetermine a large amount of moving the lens barrel 9.

Figure 13:
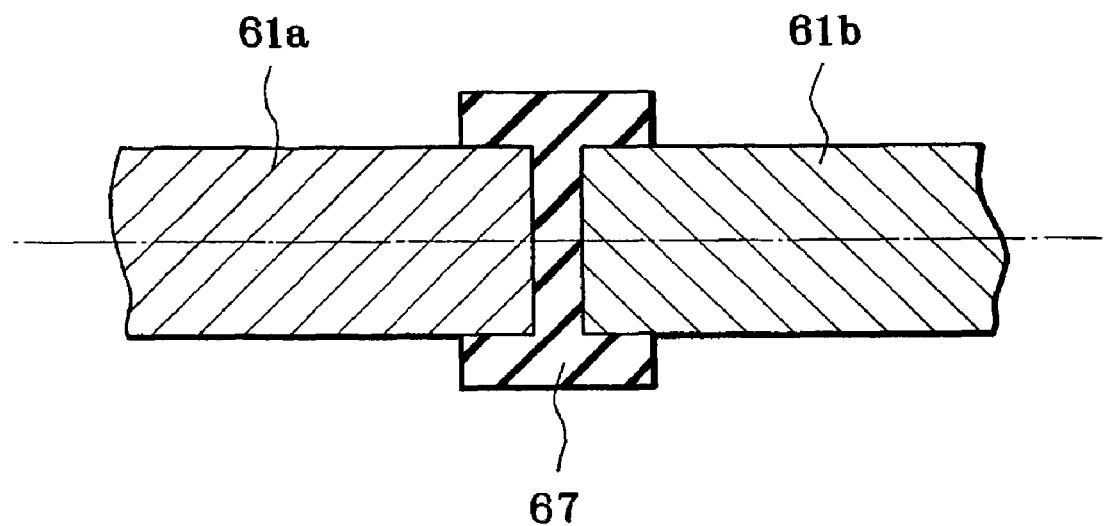
FIG. 13 is a vertical section illustrating ends of two drive shafts together with an elastic spacer.
Figure 14:
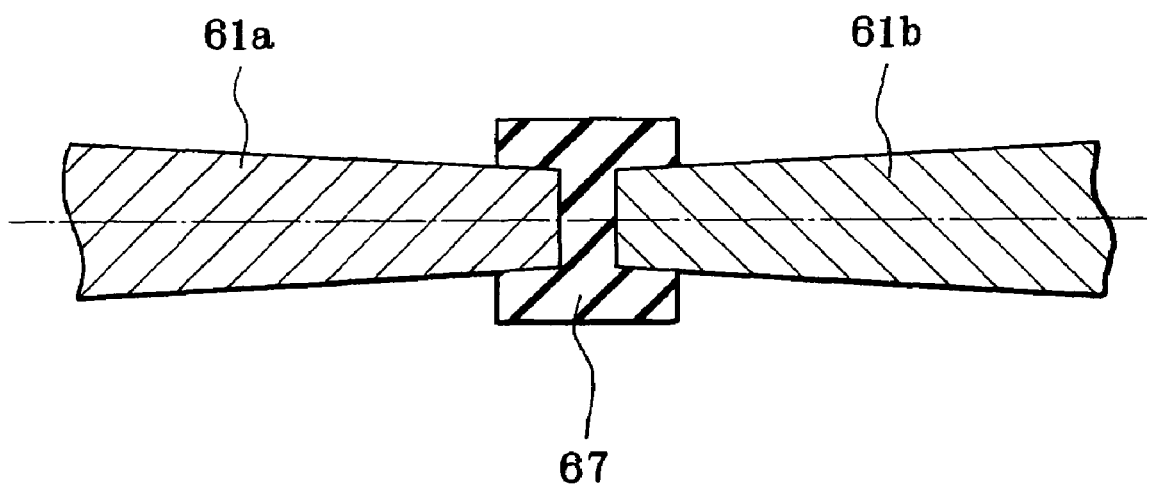
FIG. 14 is a vertical section illustrating ends of two drive shafts in a composite obtained from FIGS. 12 and 13.

In FIG. 13, one preferred embodiment includes an elastic spacer 67 fitted between the distal ends of the two drive shafts 61a and 61b having the unchanged diameter. The elastic spacer 67 prevents their distal ends from shifting with respect to the axial direction. In FIG. 14, another preferred embodiment includes the elastic spacer 67 fitted between the distal ends of the two drive shafts 61a and 61b having the decreasing diameter. The elastic spacer 67 can prevent their distal ends from shifting with respect to the axial direction in a more effective manner than FIG. 13 in view of the ends which are readily influenced by the shifting. It is to be noted that a spring such as a coil spring may be used for the elastic spacer 67.

Figure 15:
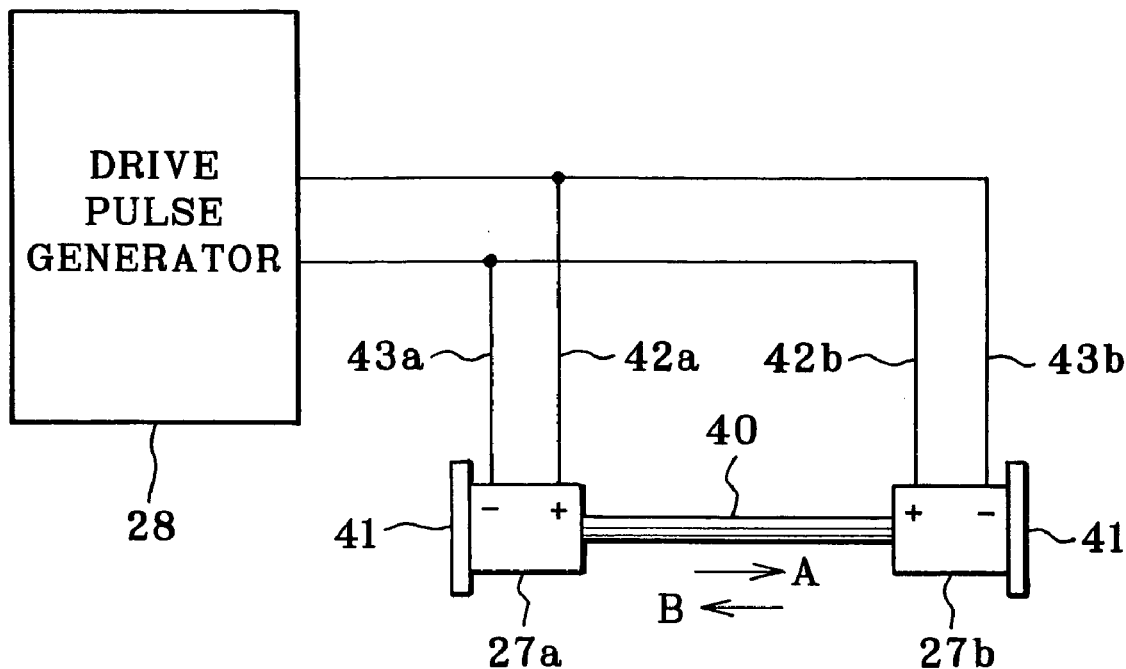
FIG. 15 is an explanatory view illustrating one preferred connection of the piezoelectric actuator and the drive pulse generator.

As illustrated in FIGS. 6A and 6B, the two signals of drive pulses are generated by the drive pulse generator 28 at polarity opposite to each other. A first one of the signals is sent to the first piezoelectric element 27a. A second one of those is sent to the second piezoelectric element 27b. However, only a single signal of a drive pulse can be used to drive the piezoelectric elements 27a and 27b. See FIG. 15. The drive pulse generator 28 is connected with the piezoelectric elements 27a and 27b in a manner different from that of FIG. 5. One terminal of the drive pulse generator 28 is connected with both of the lead 42a on the positive side of the first piezoelectric element 27a, and the lead 43b on the negative side of the second piezoelectric element 27b. Another terminal of the drive pulse generator 28 is connected with both of the lead 43a on the negative side of the first piezoelectric element 27a, and the lead 42b on the positive side of the second piezoelectric element 27b.

The signs of the voltage of the drive pulses sent to the piezoelectric elements 27a and 27b are inevitably reverse to each other. Directions of shifting of the piezoelectric elements 27a and 27b are reverse to each other. It is possible in the drive pulse generator 28 to generate only the drive pulse with either one waveform of FIG. 6A or 6B. The construction of the circuitry in the drive pulse generator 28 can be simplified.

Figure 16:
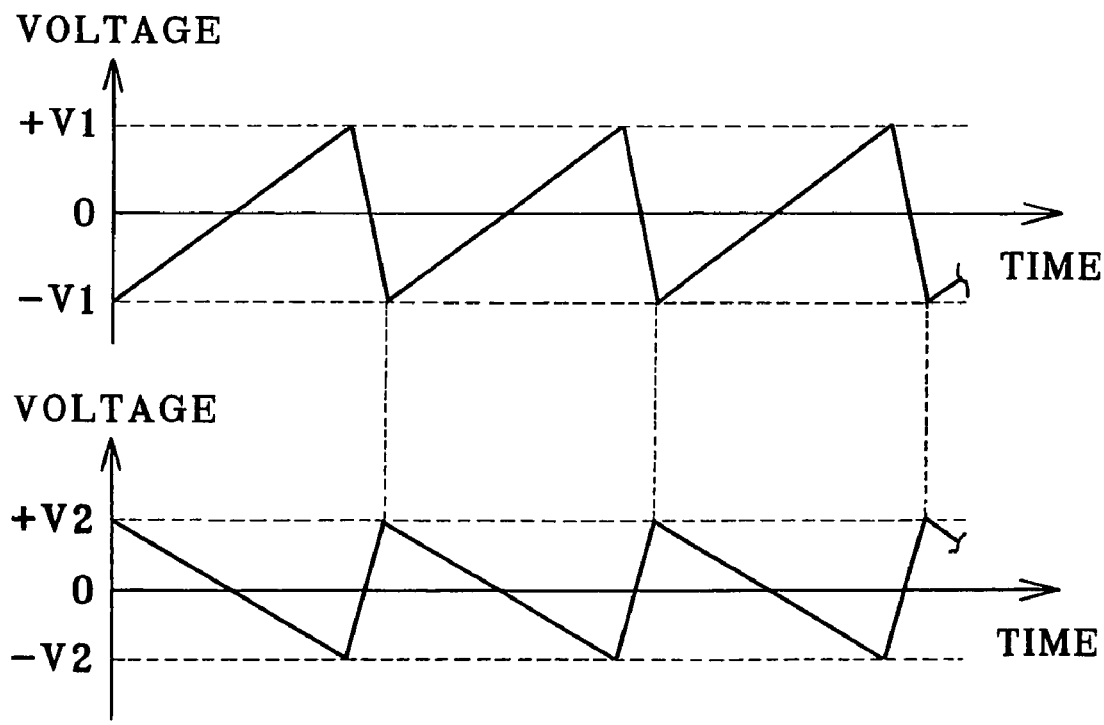
FIG. 16 is a graph illustrating two drive pulses different in the voltage swing.
Figure 17:
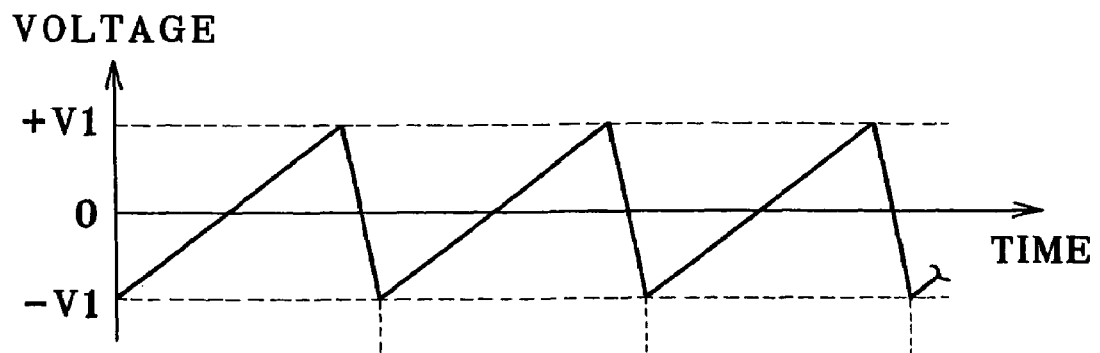
FIG. 17 is a graph illustrating two drive pulses different in the period.
Figure 17:
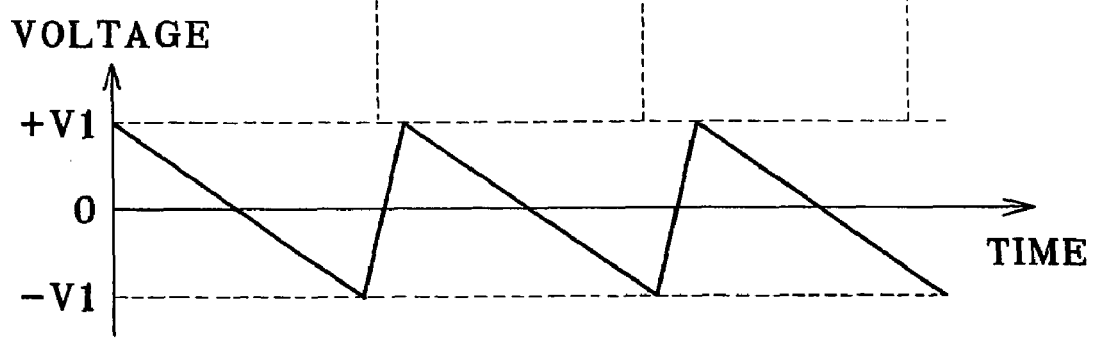
Figure 18:
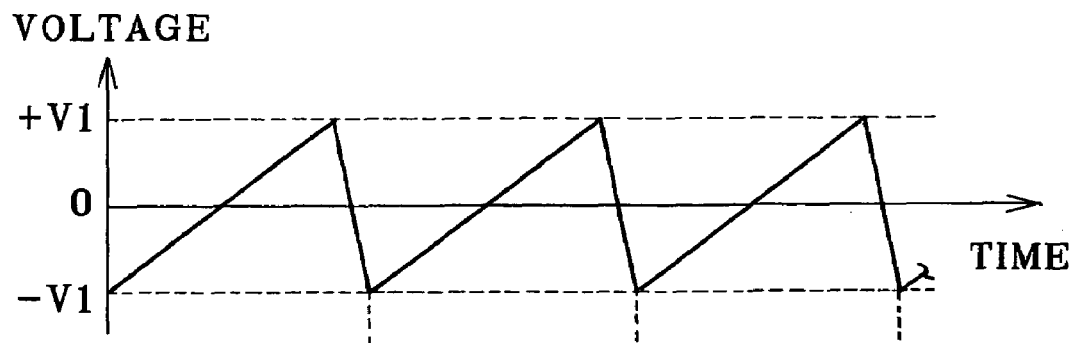
FIG. 18 is a graph illustrating two drive pulses different in the phase.
Figure 18:
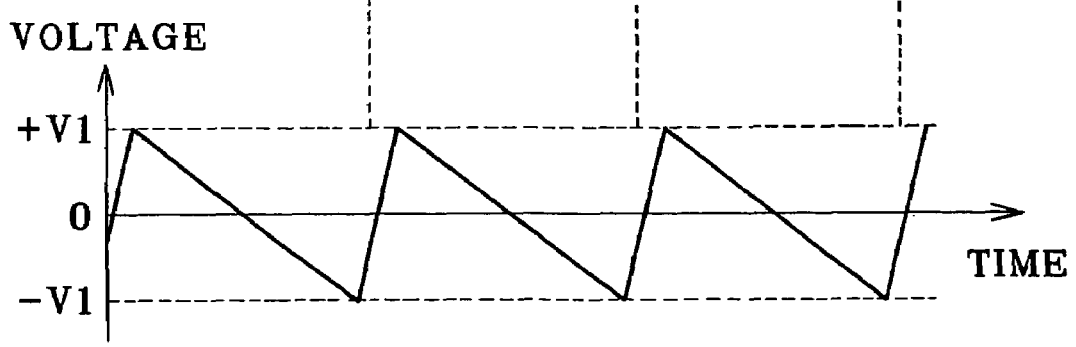

According to the above embodiment, the voltages as drive pulses for the piezoelectric elements 27a and 27b are according to the waveforms having an equal voltage swing and equal period. The signs of the voltage swings are different from each other. However, it is possible that at least one of the voltage swing, period and phase of the drive pulses can be determined different between the piezoelectric elements 27a and 27b, so that the moving speed of the lens barrel 9 can be controlled. In FIG. 16, waveforms of two drive pulses of which an absolute value of the voltage swing is different are illustrated. In FIG. 17, waveforms of two drive pulses of which the period is different are illustrated. In FIG. 18, waveforms of two drive pulses with a difference in the phase are illustrated. Such a difference in the phase is also disclosed in U.S. Pat. No. 5,134,334 (corresponding to JP-A 1-315282).

Figure 19:
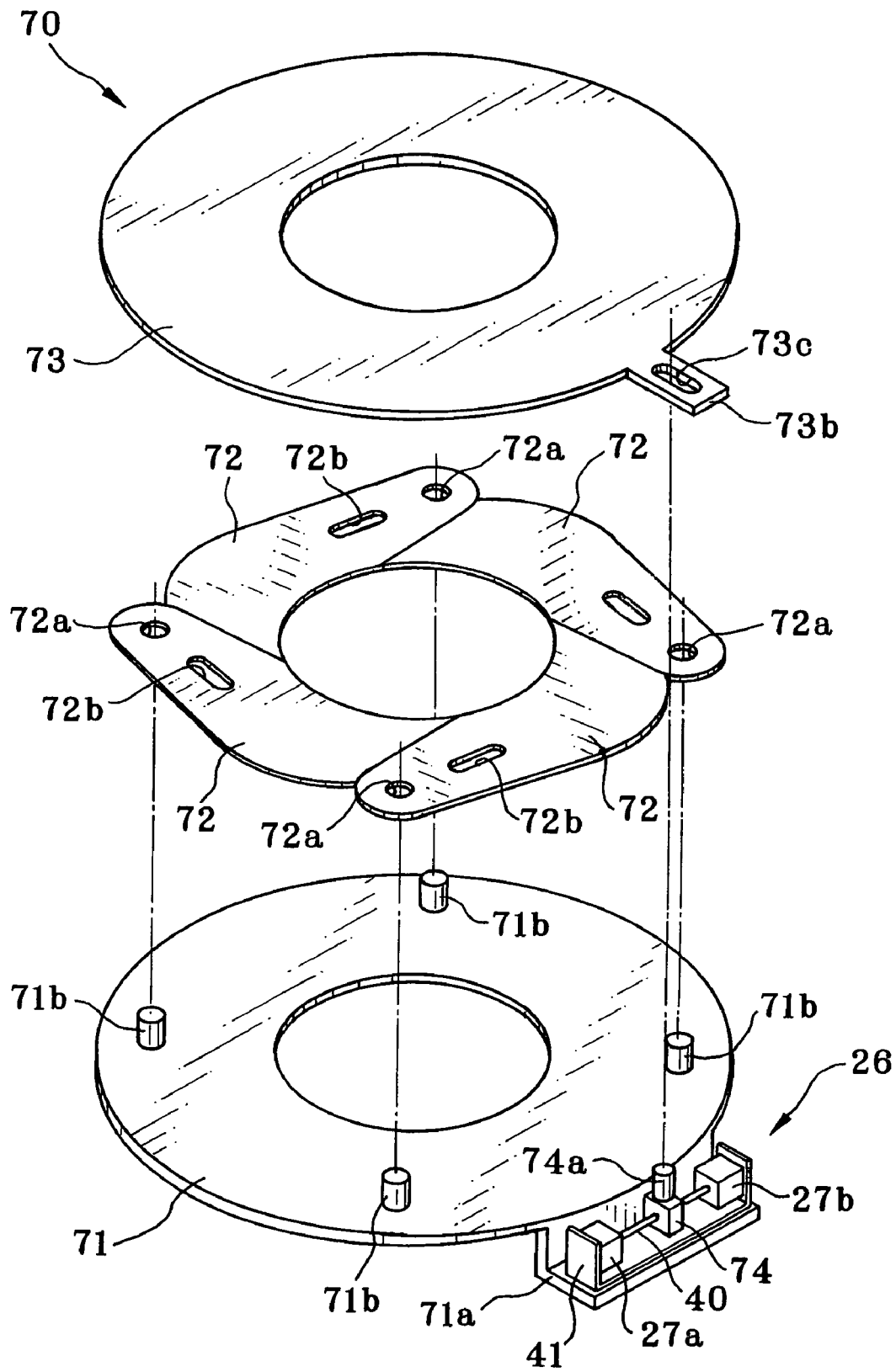
FIG. 19 is an exploded perspective illustrating one preferred use of the piezoelectric actuator in an aperture stop device.

Note that the piezoelectric actuator 26 or 60 of the invention can drive other mechanical elements than the lens barrel 9. In FIG. 19, a preferred embodiment of a piezoelectrically driven aperture stop device 70 is illustrated. The aperture stop device 70 is constituted by a base board 71, aperture stop blades 72 as light amount control unit, a rotatable ring 73 and the piezoelectric actuator 26 which is supported on the base board 71.

The base board 71 has a ring shape. A connection ridge 71a projects from the base board 71, for supporting the piezoelectric actuator 26. Four pivotal shafts 71b protrude from the upper face of the base board 71, and support the aperture stop blades 72 in a pivotally movable manner. Each of the aperture stop blades 72 has a hole 72a and a slot 72b. The hole 72a receives insertion of the pivotal shafts 71b of the base board 71. A pin 73a is formed with a lower face of the rotatable ring 73. See FIGS. 20A and 20B. The slot 72b is engaged with the pin 73a.

The rotatable ring 73 as a movable structure includes the pin 73a and an arm 73b projecting from the periphery of the ring body. An arm slot 73c is formed in the arm 73b. An engageable transmission arm 74 is fitted on the drive shaft 40 of the piezoelectric actuator 26 in a movable manner. The engageable arm 74 is engaged frictionally with the drive shaft 40. A pin 74a projects from the engageable arm 74, and is inserted in the arm slot 73c of the arm 73b.

Figure 20A:
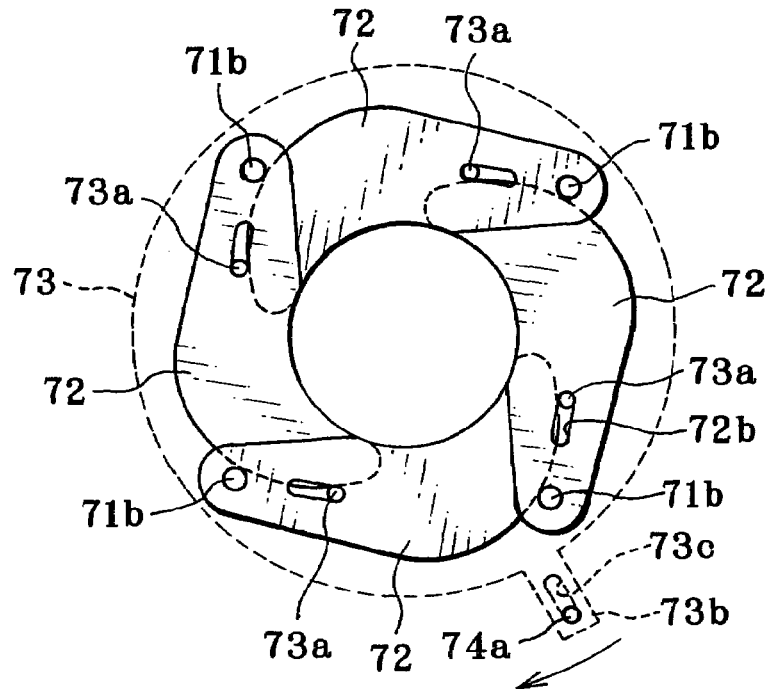
FIG. 20A is a plan view illustrating a state of the aperture stop device in a large diameter of the aperture.
Figure 20B:
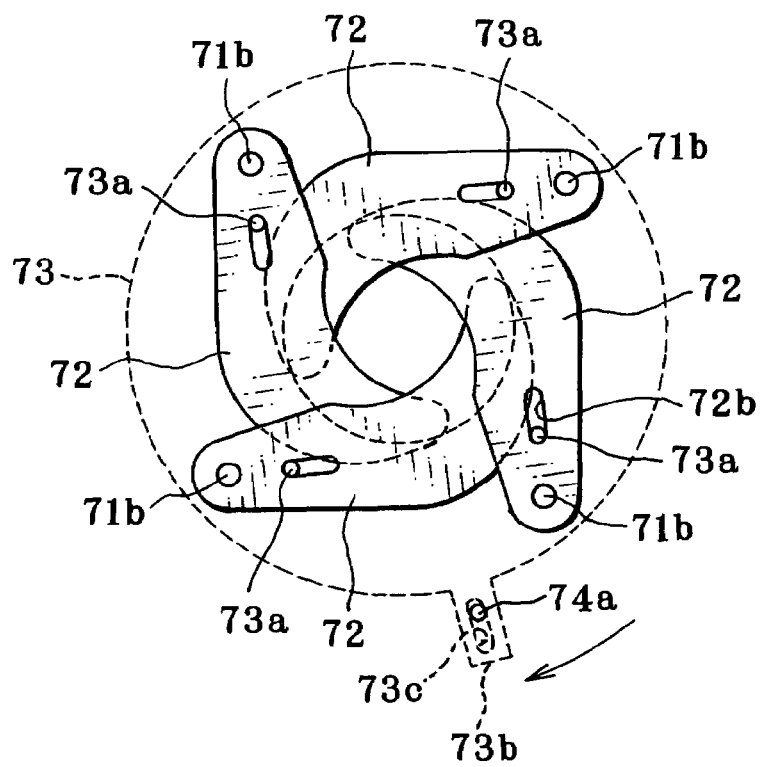
FIG. 20B is a plan view illustrating a state of the aperture stop device in a small diameter of the aperture.
Figure 21:
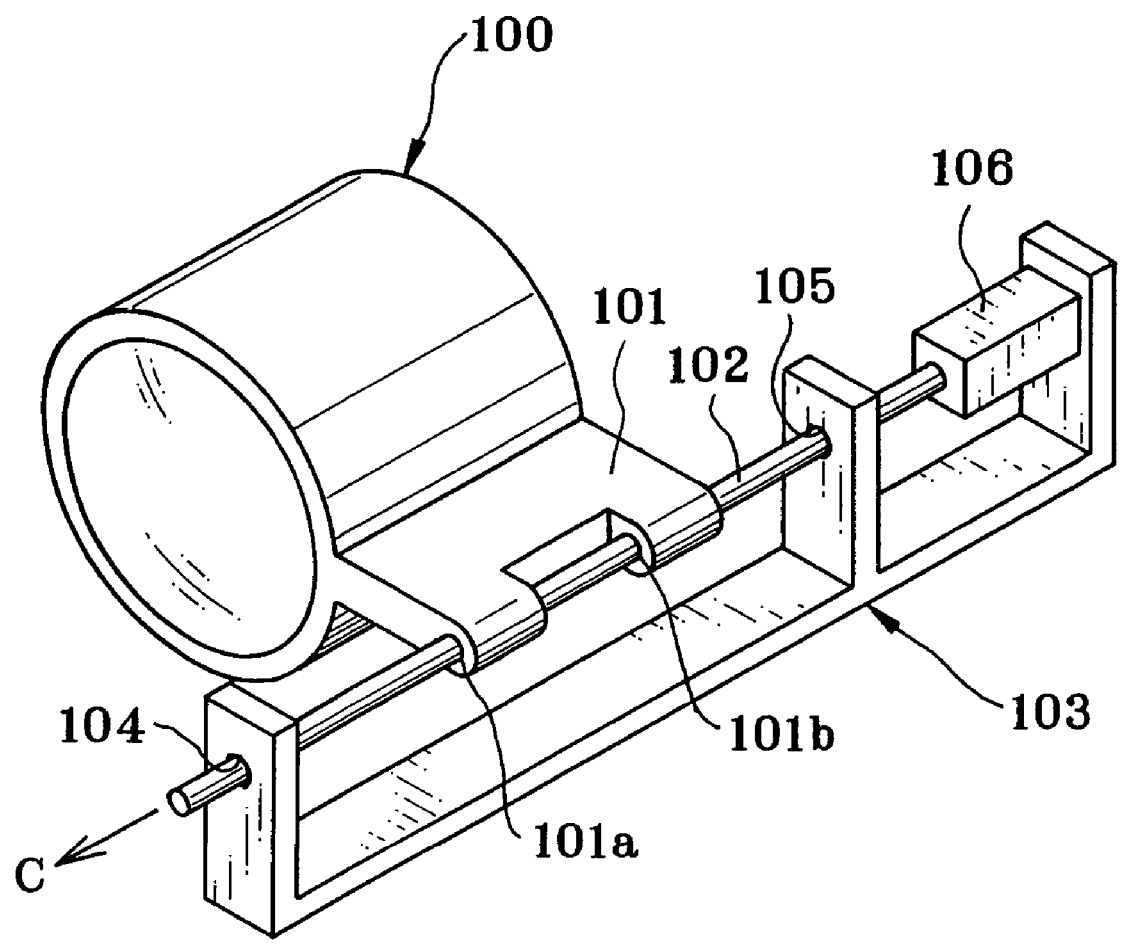
FIG. 21 is a perspective view illustrating a piezoelectric actuator according to the prior art.

In FIG. 20A, a state of the greatest diameter of the aperture stop is illustrated at the time that the aperture is maximized by externally opening the aperture stop blades 72. When the engageable arm 74 is moved toward the first piezoelectric element 27a by energizing operation of the piezoelectric actuator 26, the pin 74a inserted through the arm slot 73c in the arm 73b causes the rotatable ring 73 to rotate in the direction of the arrow. The rotation of the rotatable ring 73 causes the pin 73a to move in the slot 72b of the aperture stop blades 72. The aperture stop blades 72 moves rotationally to the inside. A stop-down state of a smaller diameter of the aperture stop is obtained as illustrated in FIG. 20B.

Note that the piezoelectric actuator 60 of FIG. 10 may be used with the aperture stop in place of the piezoelectric actuator 26. In conclusion, the aperture stop device 70 can be driven at a high speed with low noise even with a simple structure and a small space, owing to the piezoelectric actuator 26 or 60.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A driving device for moving a movable structure, comprising:
    a drive shaft, adapted to frictional engagement with an engageable portion of said movable structure, and having first and second ends;
    first and second piezoelectric elements provided with respectively said first and second ends;
    a frame portion for supporting said first and second piezoelectric elements;
    a driving circuit for expanding or contracting said first and second piezoelectric elements, and for moving said movable structure in an axial direction by an alternately repeating sequence of shifting said drive shaft at low and high speeds in said axial direction.

2. A driving device as defined in claim 1, wherein in said shifting at said low speed, said first and second piezoelectric elements shift said drive shaft in a first direction slowly, to shift said movable structure in said first direction by said frictional engagement;
    wherein in said shifting at said high speed, said first and second piezoelectric elements shift said drive shaft in a second direction quickly, to move back said drive shaft in said second direction relative to said movable structure being stationary with inertial force.

3. A driving device as defined in claim 2, wherein said driving circuit supplies said first and second piezoelectric elements with respectively first and second drive signals, and said first and second drive signals cause one of first and second piezoelectric elements to shift by expansion while a remaining one thereof shifts by contraction.

4. A driving device as defined in claim 3, wherein said first drive signal is constituted by a period of a slow rise of a voltage and a period of a quick drop of said voltage;
    said second drive signal is constituted by a period of a slow drop of said voltage and a period of a quick rise of said voltage.

5. A driving device as defined in claim 4, wherein absolute values of said first and second drive signals are equal to each other, and signs thereof are different from each other.

6. A driving device as defined in claim 4, wherein said driving circuit varies any one of a voltage swing, a period and a phase of said first and second drive signals, to control a moving speed of said engageable portion.

7. A driving device as defined in claim 3, wherein said first and second drive signals are equal to each other, and are constituted by a period of a slow rise of a voltage and a period of a quick drop of said voltage, or by a period of a slow drop of said voltage and a period of a quick rise of said voltage;
    connection of electrodes of said first piezoelectric element with said driving circuit is opposite to connection of electrodes of said second piezoelectric element.

8. A driving device as defined in claim 7, wherein said first piezoelectric element includes:
a first electrode secured to said first end of said drive shaft;
a second electrode, secured on said frame portion;
said second piezoelectric element includes:
a third electrode secured to said second end of said drive shaft, and connected in parallel with said first electrode;
a fourth electrode, secured on said frame portion, and connected in parallel with said second electrode.

9. A driving device as defined in claim 3, wherein said drive shaft comprises first and second drive shafts for extending in said axial direction, and for engagement with each other, said first drive shaft having said first end, and said second drive shaft having said second end;
said engageable portion is frictionally engaged with both said first and second drive shafts.

10. A driving device as defined in claim 9, wherein said engageable portion comprises first and second engageable portions for engagement with respectively said first and second drive shafts;
said movable structure further comprises a channel shaped arm provided with said first and second engageable portions.

11. A driving device as defined in claim 10, wherein said channel shaped arm is disposed on a lens barrel for holding a lens.

12. A driving device as defined in claim 10, further comprising:
an end recess formed in a third end of said first drive shaft; and
an end projection, formed to project from a fourth end of said second drive shaft, and fitted in said end recess.

13. A driving device as defined in claim 10, further comprising an elastic element disposed between a third end of said first drive shaft and a fourth end of said second drive shaft, for interconnection thereof.

14. A driving device as defined in claim 10, wherein said first drive shaft is shaped with a gradual decrease in a diameter thereof in a direction away from said first piezoelectric element, and said second drive shaft is shaped with a gradual decrease in a diameter thereof in a direction away from said second piezoelectric element.

15. An optical instrument comprising:
a drive shaft;
a movable structure for moving axially on said drive shaft, having an engageable portion in frictional engagement with said drive shaft;
first and second piezoelectric elements provided with respectively first and second ends of said drive shaft;
a frame portion for supporting said first and second piezoelectric elements;
a driving circuit for expanding or contracting said first and second piezoelectric elements, and for moving said movable structure in an axial direction by an alternately repeating sequence of shifting said drive shaft at low and high speeds in said axial direction;
wherein in said shifting at said low speed, said first and second piezoelectric elements shift said drive shaft in a first direction slowly, to shift said movable structure in said first direction by said frictional engagement;
wherein in said shifting at said high speed, said first and second piezoelectric elements shift said drive shaft in a second direction quickly, to move back said drive shaft in said second direction relative to said movable structure being stationary with inertial force.

16. An optical instrument as defined in claim 15, wherein said movable structure comprises a lens barrel for holding a lens.

17. An optical instrument as defined in claim 16, wherein said engageable portion comprises first and second engageable portions;
further comprising a channel shaped arm disposed on a periphery of said barrel, and provided with said first and second engageable portions.

18. An optical instrument as defined in claim 17, further comprising a solid state pickup element for photoelectrically converting object light into a pickup signal, said object light being focused by said lens.

19. An optical instrument as defined in claim 15, wherein said movable structure comprises a rotatable ring;
further comprising a light amount control unit for controlling a light amount of incident light upon rotation of said rotatable ring.

20. A driving device for moving a movable structure, comprising:
first and second drive shafts for extending in an axial direction, and for engagement with each other, said first and second drive shafts being adapted to frictional engagement with an engageable portion of said movable structure;
first and second piezoelectric elements provided with first and second ends of respectively said first and second drive shafts;
a frame portion for supporting said first and second piezoelectric elements;
an elastic element disposed between a third end of said first drive shaft and a fourth end of said second drive shaft, for interconnection thereof;
a driving circuit for supplying said first and second piezoelectric elements with a drive signal to expand or contract said first and second piezoelectric elements, and for moving said movable structure in said axial direction by an alternately repeating sequence of shifting said first and second drive shafts at low and high speeds in said axial direction;
wherein in said shifting at said low speed, said first and second piezoelectric elements shift said first and second drive shafts in a first direction slowly, to shift said movable structure in said first direction by said frictional engagement;
wherein in said shifting at said high speed, said first and second piezoelectric elements shift said first and second drive shafts in a second direction quickly, to move back said first and second drive shafts in said second direction relative to said movable structure being stationary with inertial force.

21. A driving device as defined in claim 20, wherein said driving circuit supplies said first and second piezoelectric elements with respectively first and second drive signals, and said first and second drive signals cause one of first and second piezoelectric elements to shift by expansion while a remaining one thereof shifts by contraction.

22. A driving device as defined in claim 21, wherein said engageable portion comprises first and second engageable portions for engagement with respectively said first and second drive shafts;
said movable structure comprises a channel shaped arm provided with said first and second engageable portions.

23. A driving device as defined in claim 22, wherein said first drive signal is constituted by a period of a slow rise of a voltage and a period of a quick drop of said voltage;

said second drive signal is constituted by a period of a slow drop of said voltage and a period of a quick rise of said voltage.

24. A driving device as defined in claim 23, wherein absolute values of said first and second drive signals are equal to each other, and signs thereof are different from each other.

25. A driving device as defined in claim 23, wherein said driving circuit varies any one of a voltage swing, a period and a phase of said first and second drive signals, to control a moving speed of said engageable portion.

26. A driving device as defined in claim 21, wherein said first and second drive signals are equal to each other, and are constituted by a period of a slow rise of a voltage and a period of a quick drop of said voltage, or by a period of a slow drop of said voltage and a period of a quick rise of said voltage;
   connection of electrodes of said first piezoelectric element with said driving circuit is opposite to connection of electrodes of said second piezoelectric element.

27. An optical instrument comprising:
   first and second drive shafts for extending in an axial direction, and for engagement with each other;
   a movable structure for moving axially on said first and second drive shafts, having an engageable portion in frictional engagement with said first and second drive shafts;
   first and second piezoelectric elements provided with first and second ends of respectively said first and second drive shafts;
   a frame portion for supporting said first and second piezoelectric elements;
   an elastic element disposed between a third end of said first drive shaft and a fourth end of said second drive shaft, for interconnection thereof;
   a driving circuit for supplying said first and second piezoelectric elements with a drive signal to expand or contract said first and second piezoelectric elements, and for moving said movable structure in said axial direction by an alternately repeating sequence of shifting said first and second drive shafts at low and high speeds in said axial direction;
   wherein in said shifting at said low speed, said first and second piezoelectric elements shift said first and second drive shafts in a first direction slowly, to shift said movable structure in said first direction by said frictional engagement;
   wherein in said shifting at said high speed, said first and second piezoelectric elements shift said first and second drive shafts in a second direction quickly, to move back said first and second drive shafts in said second direction relative to said movable structure being stationary with inertial force.

28. An optical instrument as defined in claim 27, wherein said movable structure comprises a lens barrel for holding a lens.

29. An optical instrument as defined in claim 28, further comprising a solid state pickup element for photoelectrically converting object light into a pickup signal, said object light being focused by said lens.

30. An optical instrument as defined in claim 27, wherein said movable structure comprises a rotatable ring;
   further comprising a light amount control unit for controlling a light amount of incident light upon rotation of said rotatable ring.

* * * * *